UNITED STATES PATENT OFFICE.

DAVID THOMAS AND SAMUEL THOMAS, OF TROWELL FORGE, ENGLAND, ASSIGNORS OF TWO-THIRDS OF THEIR RIGHT TO THOMAS O. HAMPTON, OF JOLIET, ILLINOIS.

FIX OR FETTLING FOR PUDDLING-FURNACES.

SPECIFICATION forming part of Letters Patent No. 231,121, dated August 10, 1880.

Application filed January 29, 1880.

*To all whom it may concern:*

Be it known that we, DAVID THOMAS and SAMUEL THOMAS, of Trowell Forge, in the shire of Nottingham, England, have jointly invented a new and useful Improvement in Fixes or Fettlings for Puddling-Furnaces, which compound is fully set forth in the following description.

This invention relates to that class of compounds used in preparing the hearth or lining of a puddling-furnace before receiving its charge of iron, and is usually composed of cinder, ore, and wrought-iron scrap. The two last-named substances usually being quite an item of expense in the manufacture of wrought-iron, it is therefore the object of the present invention to furnish a substitute therefor, it also having been practically demonstrated that a quality of iron that is considered in every way first-class can by its use be produced from a quality of pig-metal (iron) which has heretofore, by the use of the ordinary fix, been found to be utterly worthless for the purpose.

To prepare the fix or fettling, take either of "taps" (slag or cinder tapped from puddling-furnace) or "flue cinder" (that tapped from flue of reheating-furnaces) two (2) parts, by weight, and of lime or limestone one (1) part; of either squeezer, hammer, or rolls cinder or "bosh dirt" (that cinder taken from furnace on tools and which becomes detached in cooling in water-boshes,) and of lime or limestone equal parts. Both ingredients are charged together and melted in a puddling-furnace at a temperature so high as to cause them to become exceedingly fluid, when their combination properly takes place. The fix or fettling thus formed is then tapped out of furnace and run into suitable molds and allowed to cool. It is then to be ground, when it is ready for use in furnace, placing the coarser particles underneath and the finer particles on top.

Having thus described our invention, what we claim is—

A compound composed of furnace or mill cinder or slag, in combination with lime or limestone, to form a fix or fettling to be used in puddling-furnaces in the manufacture of wrought-iron.

DAVID THOMAS. [L. S.]
SAMUEL THOMAS. [L. S.]

Witnesses:
H. W. GOUGH, C. E.,
J. H. GOUGH,
    *Nottingham, England.*